(12) United States Patent  
Oakeson et al.

(10) Patent No.: US 6,502,752 B2
(45) Date of Patent: Jan. 7, 2003

(54) METHOD AND SYSTEM FOR ENCODING INFORMATION ON A PRINTED PAGE BY MODULATION OF THE DOT DEVELOPMENT

(75) Inventors: Kenneth L. Oakeson, Boise, ID (US); Doron Shaked, Haifa (IL); Paul L. Jeran, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 187 days.

(21) Appl. No.: 09/769,221

(22) Filed: Jan. 23, 2001

(65) Prior Publication Data

US 2002/0134841 A1 Sep. 26, 2002

(51) Int. Cl.$^7$ ................................................. G06N 7/10
(52) U.S. Cl. .............................. 235/462.25; 235/472.01
(58) Field of Search ....................... 235/462.01, 462.02, 235/462.03–462.25, 462.26–462.3, 472.01–472.03, 454, 455, 494, 470, 468

(56) References Cited

U.S. PATENT DOCUMENTS

| | | | | |
|---|---|---|---|---|
| 5,304,786 A | * | 4/1994 | Pavlidis et al. ............. | 235/456 |
| 5,399,846 A | * | 3/1995 | Pavlidis et al. ............ | 235/462.1 |
| 5,668,874 A | * | 9/1997 | Kristol et al. ................ | 235/380 |
| 5,815,200 A | * | 9/1998 | Ju et al. ................. | 235/462.01 |
| 6,032,861 A | * | 3/2000 | Lemelson et al. ........... | 235/456 |
| 6,062,481 A | * | 5/2000 | Storch et al. ................ | 235/494 |
| 6,212,504 B1 | * | 4/2001 | Hayosh ...................... | 235/375 |
| 6,373,587 B1 | * | 4/2001 | Sansone ...................... | 358/1.1 |
| 6,338,696 B1 | * | 4/2002 | Hertz et al. .................. | 382/181 |
| 6,386,454 B2 | * | 5/2002 | Hecht et al. ............ | 235/462.16 |
| 6,398,117 B1 | * | 6/2002 | Oakeson et al. ............. | 235/456 |
| 6,427,922 B1 | * | 8/2002 | Marchand .............. | 235/462.46 |

* cited by examiner

*Primary Examiner*—Thien M. Le (57) ABSTRACT

A system and method for developing a bar code representing the encoding of a set of data, in which the bar code includes pixels having one black level, one white level and at least one gray level, generates a multi-level data representation of the set of data, the number of levels corresponding to the sum of the black level, the white level and the number of gray levels. A pixel color is determined for each component of the multi-level data representation, a pixel color for at least one of the components being one of the at least one gray levels. The determined pixel color is then printed for each component to form the bar code.

38 Claims, 6 Drawing Sheets

METHOD AND SYSTEM FOR ENCODING INFORMATION ON A PRINTED PAGE BY MODULATION OF THE DOT DEVELOPMENT

FIELD OF THE INVENTION

The present invention relates generally to encoding and decoding bar codes, and more particularly to a system and method for encoding and decoding multi-level bar codes having multiple gray levels using pulse width modulation.

BACKGROUND OF THE INVENTION

Methods for encoding information on a printed page with a laser printer are subject to the limitations of the printing mechanism. Among these limitations, with respect to monochrome electrophotographic printers, is the limitation of only printing black or white dots at or near the maximum resolution of a device.

For high capacity spatial data encoding, there are several variables that would allow for a higher data density to be achieved, including compression, resolution and bits per pixel. Compression of pseudo-random or unknown data is typically maximized using existing techniques, such as Run-Length-Encoding or Huffman Encoding, beyond which data loss can occur. Increased resolution can be difficult to obtain without significant expense with respect to laser printing because it requires improvements in areas such as the mirror spin rate, the laser spot size, the dot shape, noise factors in the printing process, and the electrophotographic process itself. On the scanning side, increasing resolution would require reduction of noise in the scanning process and improvements in the scanner resolution. With respect to bits per pixel, monochrome laser printers typically only achieve one bit per pixel, i.e., a binary representation based on black and white pixels.

Even though monochrome laser printers are limited to printing black and white dots, these printers can simulate levels of gray by creating a halftone cell of black and white dots. Techniques for simulating the gray levels include variations of dithering and error diffusion. Such techniques, however, decrease the maximum resolution and capacity of the encoding because gray pixels are made from cells of multiple black and white dots.

SUMMARY OF THE INVENTION

Briefly, a method for developing a bar code representing the encoding of a set of data, the bar code including pixels having one black level, one white level and at least one gray level, generates a multi-level data representation of the set of data, the number of levels corresponding to the sum of the black level, the white level and the number of gray levels. A pixel color is determined for each component of the multi-level data representation, a pixel color for at least one of the components being one of the at least one gray levels. The determined pixel color is then printed for each component to form the bar code.

In another aspect of the invention, the set of data is converted into a base corresponding to the numbers of levels of the multi-level data.

In yet another aspect of the invention, the printing of each pixel includes modulating a laser, and keeping the laser on for less that a full period t for each pixel having a gray level. The laser is kept on for a first portion of the period t for a first pixel having a first gray level and is kept on for a second portion of the period t for a second pixel having a second gray level, wherein the first portion is longer than the second portion if the first pixel is darker than the second pixel.

DETAILED DESCRIPTION OF THE PREFERRED EMBODIMENT

Figure 1:
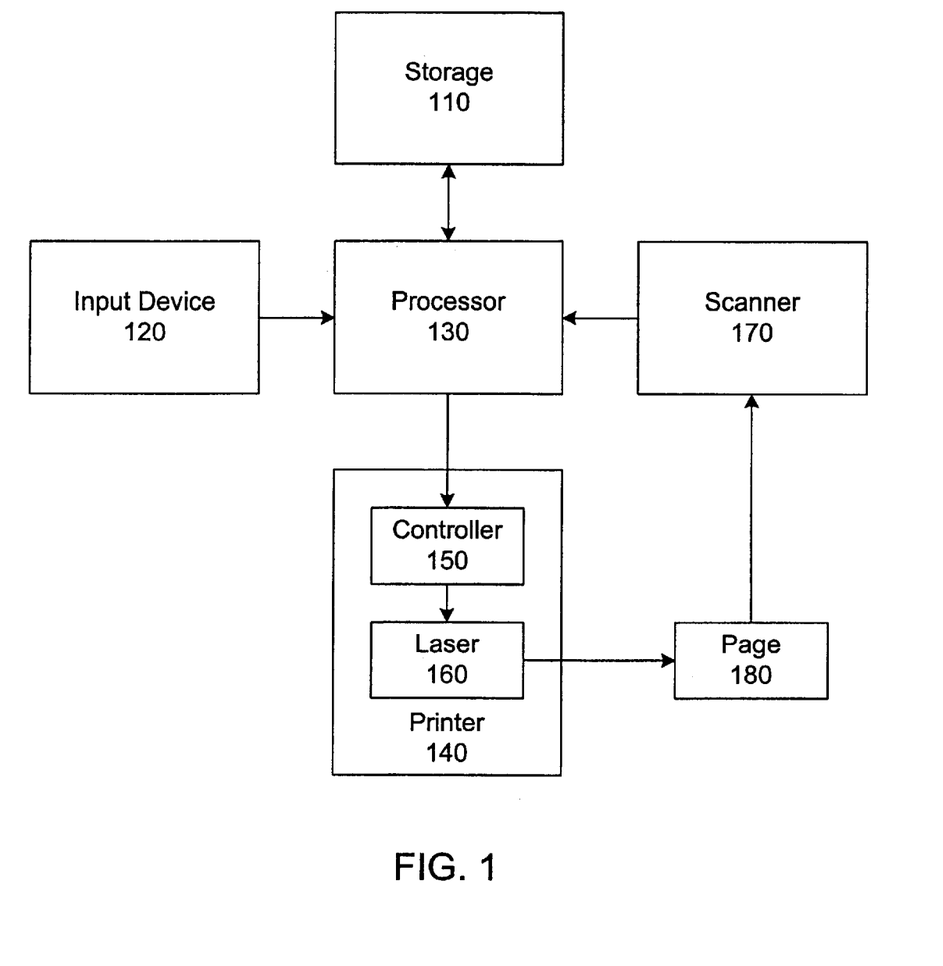
FIG. 1 is a block diagram of a bar code encoding and decoding system consistent with the present invention.

FIG. 1 is a block diagram of a bar code encoding and decoding system consistent with the present invention. As shown in FIG. 1, the system includes a storage 110, an input device 120, a processor 130, a printer 140 having a controller 150 and a laser 160, and a scanner 170. The laser may print to and the scanner may read from a page 180. The input device 130 may be implemented as a keyboard, a mouse or other type of device for entering information into a computer. Information entered through the input device 120 may be stored in the storage 110 or provided to the processor 130.

The storage 110 may be implemented, for example, as a random access memory (RAM), a hard disk drive, some combination thereof, or any other convenient configuration including a networked configuration that is capable of storing information both permanently and temporarily. Note that the storage 110 may be implemented by storage across a network or the Internet. Information stored in the storage 110 may include relevant data, bitmaps of images, or other useful information.

The processor 130 receives information from the input device 120, the storage 110 and the scanner 170. The processor 130 may be configured to implement the bar code encoding and decoding process discussed below. Alternatively, the bar code encoding and decoding process consistent with the present invention may be implemented as a software application stored in the storage 110 or another convenient memory that is executed by the processor 130. When executing the bar code encoding process, the processor 130 may output the generated bar code to the printer 140 for printing on the page 180. When executing the bar code decoding process, the processor 130 may receive bar code information that is scanned from a document by the scanner 170. The scanner 170 may also be used to scan in images or data for storage in the storage 110.

When printing the bar code on the page 180, the controller 150 receives instructions from the processor 130 and processes the instructions to control the operation of the laser 160. The laser 160 is controlled to produce an image on the page 180. When printing a bar code, the processor 130 may use information stored in the storage 110 to create a bar code and provide instructions to the controller 150 to control the operation of the laser 160 so as to print the bar code on the page 180.

Figure 2:
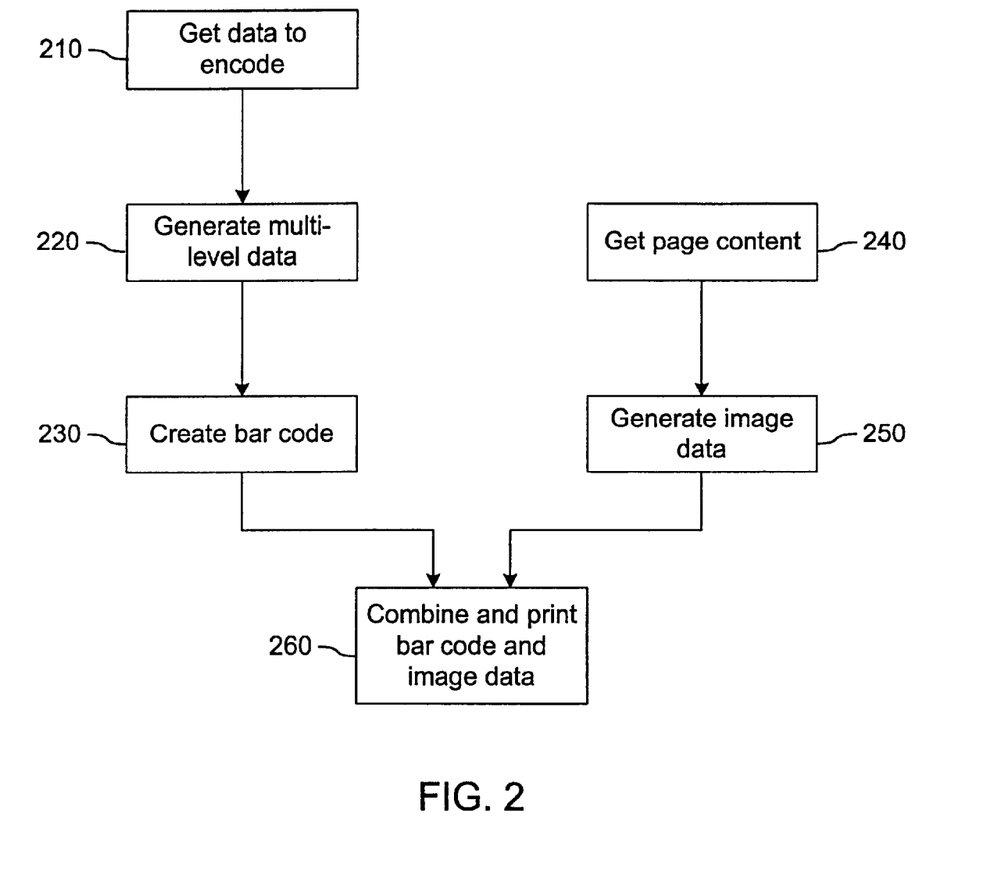
FIG. 2 is a flow diagram of a bar code encoding process consistent with the present invention.

FIG. 2 is a flow diagram of a bar code encoding process consistent with the present invention. This process may be implemented on the system described in FIG. 1. For example, the instructions for carrying out the process may be stored in the storage 110 and executed by the processor 130 to direct the controller 150 in the operation of the laser 160.

As shown in FIG. 2, the first step in the encoding process is to obtain data that is to be encoded in a bar code (step 210). The data may be, for example, text, numbers or combinations thereof, such as addresses, names, document tracking numbers, URLs, or company data, which are also typically stored in the storage 110. Multi-level data is then generated from the data to be encoded (step 220). Multi-level refers to the amount of data each pixel in the bar code will encode. Also, consistent with the present invention, multi-level refers to the number of gray levels in the bar code. The number of gray levels refers to the number of different color levels in the bar code including black, white and one or more gray levels. For example, if the bar code has black, white, light gray and dark gray pixels, the bar code would be a 4-level bar code.

The type of data to be encoded and the level of the bar code affects the way in which the multi-level data is generated. For example, if the data to be encoded is binary data, and the bar code is a 4-level bar code, then every two bits of data would be grouped together to form each portion of the multi-level data. Table 1 below shows an example of how binary data to be encoded is converted into multi-level data for a 4-level bar code.

TABLE 1

| Binary Data to be Encoded | Multi-level Data | Gray Level |
| --- | --- | --- |
| 00 | 0 | White |
| 01 | 1 | Light Gray |
| 10 | 2 | Dark Gray |
| 11 | 3 | Black |

The conversion of the data to be encoded into multi-level data may require grouping of data and conversions between bases. In the example of Table 1, the data to be encoded is binary. Since the multi-level data is four levels, and every two bits of binary data has four values, every two bits of the binary data is grouped together. The grouped pair of binary bits may then be converted to base-4, as shown in the 'Multi-level Data' column of Table 1. However, if the data to be encoded was in hexadecimal, and the multi-level data is four levels, the hexadecimal data may first be converted into binary data before being converted into base-4 or it may be converted directly into base-4.

After generating the multi-level data, the bar code is created from the multi-level data (step 230). The bar code is preferably formed as a two-dimensional bar code, although other dimensions may be used as is known in the art. For ease of explanation, the following discussion will be limited to a two dimensional bar code. To create the bar code, the color of each pixel is chosen in accordance with a corresponding value of the multi-level data. For example, with reference to Table 1, a string of binary data having 18 bits could be formed as a 3×3 bar code.

Figure 3A:
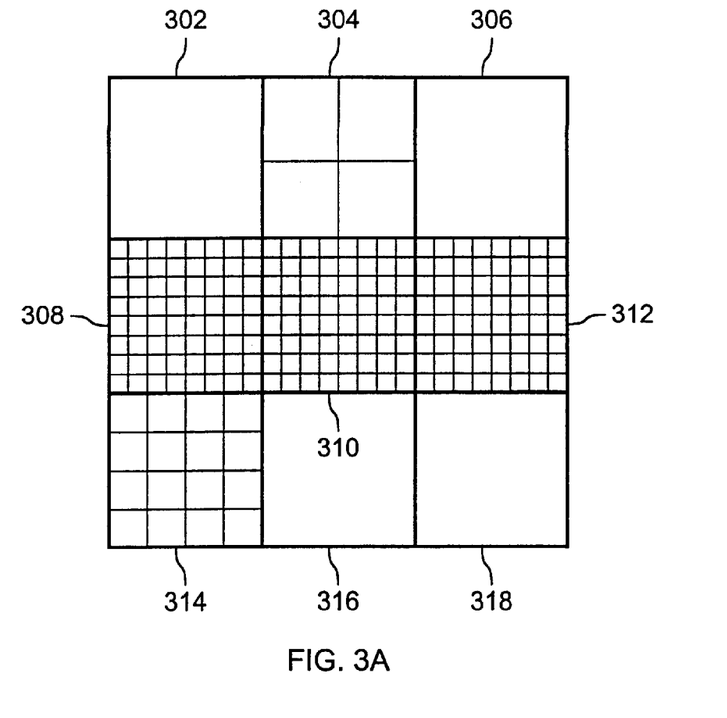
FIG. 3A shows an example of a two-dimensional bar code consistent with the present invention.

FIG. 3A shows an example of a two-dimensional bar code formed in accordance with Table 1. As shown in FIG. 3A, the bar code has pixels 302 to 318 for which pixels 302, 306, 316 and 318 are white, pixels 308 to 312 are black, pixel 304 is light gray and pixel 314 is dark gray. Using Table 1, the binary string of data to form the bar code shown in FIG. 3A would be the following: 000100111111100000. The first two bits of this string are '00', which corresponds to a white pixel, the next two bits are '01', which corresponds to a light gray pixel, and so on. In this example, the pixels are formed from left to right and top to bottom. It should be understood that the two-dimensional bar code may be formed in any manner, such as top to bottom before left to right.

Figure 3B:
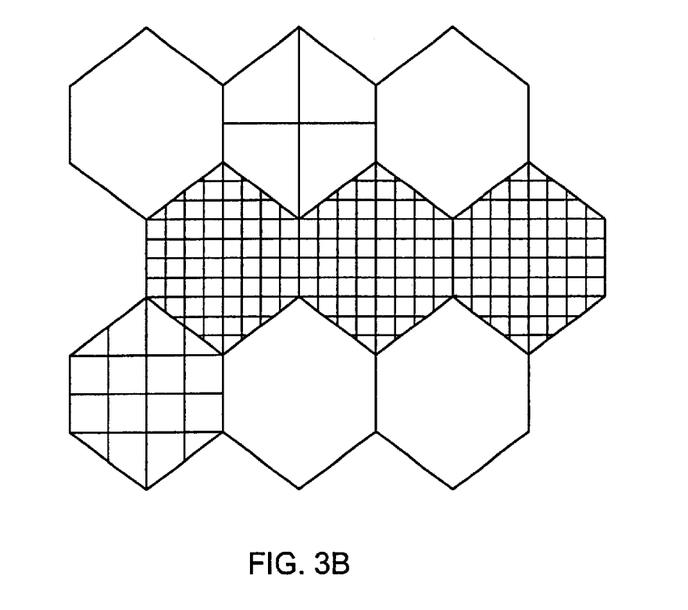
FIG. 3B shows an example of the bar code using pixels formed in a hexagonal shape consistent with the present invention.

Depending on the desired resolution, each pixel in the bar code of FIG. 3A may represent a single dot at the maximum resolution of the printer 140, or may represent a block of dots. For example, each pixel in the bar code of FIG. 3A may actually represent an 8×8 block of dots. Using a block of pixels helps facilitate the scanning and decoding of the bar code. It is also possible to have the shape of the blocks of pixels be different than squares. Other polygons such as rectangles and hexagons may also be used and may also facilitate improved scanning and decoding of the bar code. FIG. 3B shows an example of the bar code using pixels formed in a hexagonal shape.

Before printing the bar code on the page 180, content to be printed on the page with the bar code is first obtained (step 240). The content may be set forth in a page description language, such as postscript data or raster data, or an image description format, such as a GIF or JPEG file. An image is then formed from the obtained content (step 250). In general, the image is generated by converting the page or image description language into a corresponding black and white image. This image is then combined with the bar code and printed on the page 180 (step 260). It is not necessary, however, for the bar code to be printed on the page 180 in combination with an image. Rather, the bar code may be printed on the page 180 with no other content on the page 180.

As discussed above, because current systems are limited to printing black and white dots only, the printer is limited to encoding one bit per pixel, where black equals zero and white equals one or vice versa. Having a level of gray that can be generated in addition to black and white increases the encoding by an additional bit per pixel. In current systems, however, gray areas can only be produced by mixing black and white dots to form the gray pixels. Using this process, however, reduces the resolution of the bar code because each pixel requires multiple dots to produce the gray level.

Figure 4:
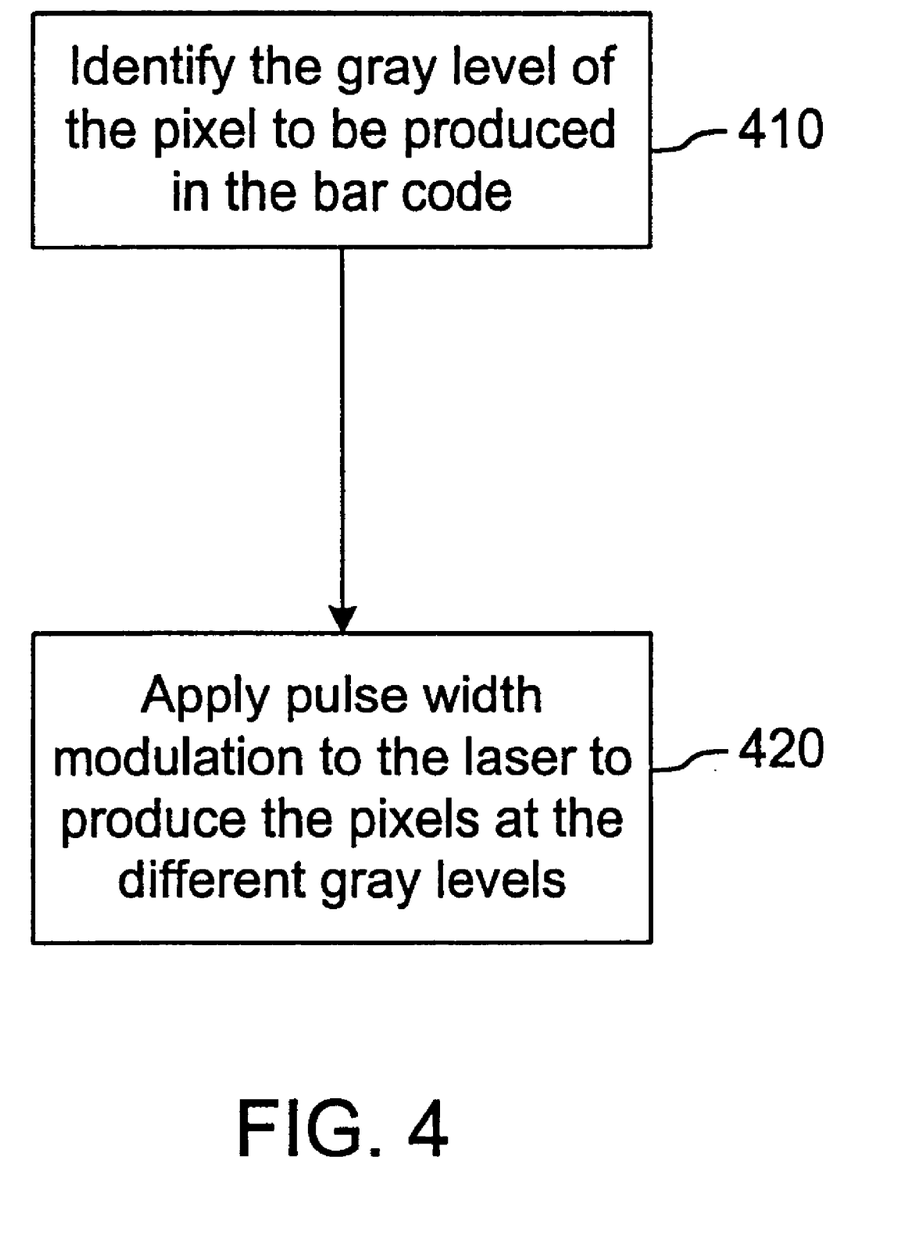
FIG. 4 shows a flow diagram for a printing process consistent with the present invention.

FIG. 4 shows a flow diagram for a printing process consistent with the present invention for increasing the resolution and producing gray pixels without using a mix of black and white dots. This printing process is preferably implemented using the processor 130 and the controller 150 to control the operation of the laser 160 when printing the bar code on the page 180.

As shown in FIG. 4, the first step is to identify the gray level of the pixel to be produced in the bar code (step 410). The gray level is identified from the multi-level data generated in step 220 of the encoding process of FIG. 2. Then, pulse width modulation (PWM) is applied to the laser 160 to produce the pixels at different gray levels (step 420). Using PWM turns the laser 160 on and off during the period that a pixel is being produced. By turning the laser 160 on and off, the resultant voltage on the photoconductor is lessened, which causes less toner to stick to the OPC [0]. This lessened amount of toner results in a lower amount of toner being transferred to the page 180. The longer the laser 160 is on, the darker the pixel that is produced. However, the relationship between the time the laser 160 is off with respect to the grayness of the pixel need not be a direct relationship. In other words, a pixel may not be twice as dark as another pixel where the laser 160 is on twice as long.

By using laser PWM, the printer 140 can distribute a charge and attract fewer toner particles, giving a pixel a gray appearance, rather than a black appearance. It is also possible to modify the optical density of the pixels, and therefore vary the gray levels of the pixels, using an LED type electrophotographic printer instead of using laser PWM.

Multiple levels of pixel color can also be applied to pixels of colors other than gray. In particular, multiple levels of different colors, such as those of a color printer, may be produced using PWM for each of the different colors. For example, if a bar code include red, yellow and green, then PWM may be used to produce multiple levels of each of the three colors red, yellow and green.

Figure 5A:
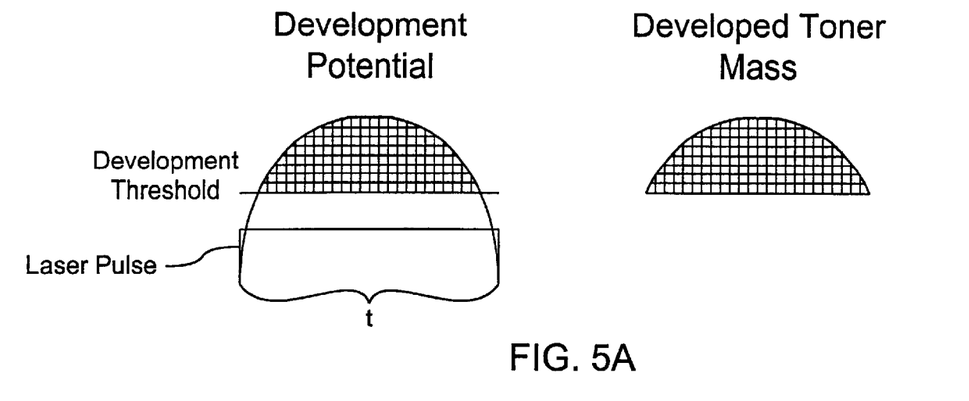
FIGS. 5A to 5C show examples of PWM voltage trains which produce different toner masses corresponding to different gray levels consistent with the present invention.
Figure 5B:
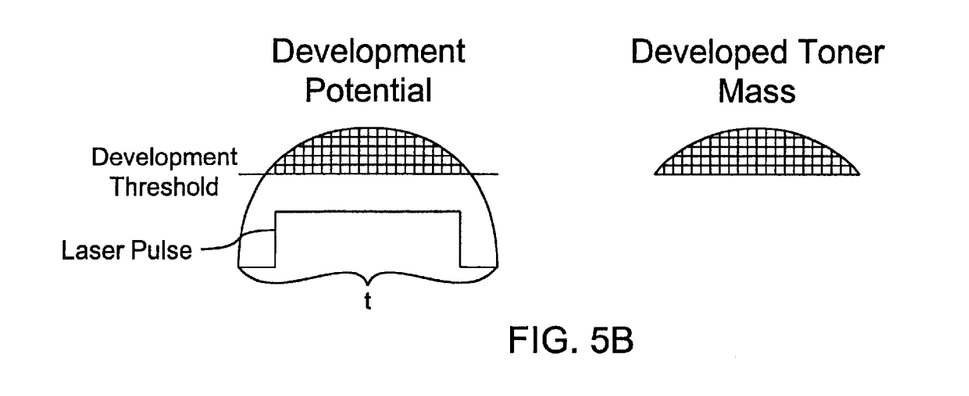
Figure 5C:
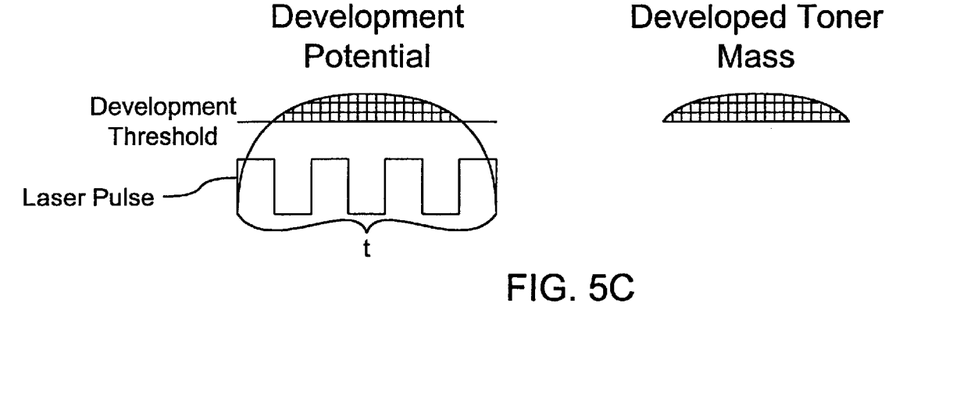

FIGS. 5A to 5C show examples of PWM voltage trains which produce different toner masses corresponding to different gray levels. In each figure, a laser pulse results in a development potential during a period t. In FIG. 5A, the laser pulse results in the highest development potential for the entire period t, which attracts the most toner possible. As a result, the toner mass developed from the laser pulse of FIG. 5A produces the darkest pixel, i.e., a black pixel.

In FIGS. 5B and 5C, the laser pulse is turned on and off during the period t. As a result, the development potential of the toner in excess of the development threshold is less than that of the laser pulse in FIG. 5A, which results in smaller toner masses having lower optical densities. With respect to each other, the laser pulse of FIG. 5B produces a larger toner mass than the laser pulse of FIG. 5C because the laser pulse of FIG. 5B is on for more of period t than the laser pulse of FIG. 5C. By turning the laser pulse on and off during the period t, it is possible to produce a pixel with a smaller toner mass which appear to have a lighter, gray appearance. In the example of FIGS. 5B and 5C, the toner masses or optical densities may correspond to a dark gray pixel and a light gray pixel in a four-level bar code. A white pixel may be produced by keeping the laser pulse off for the entire period t, and a black pixel may be produced by keeping the laser pulse on for the entire period t, such as shown in FIG. 5A.

Figure 6:
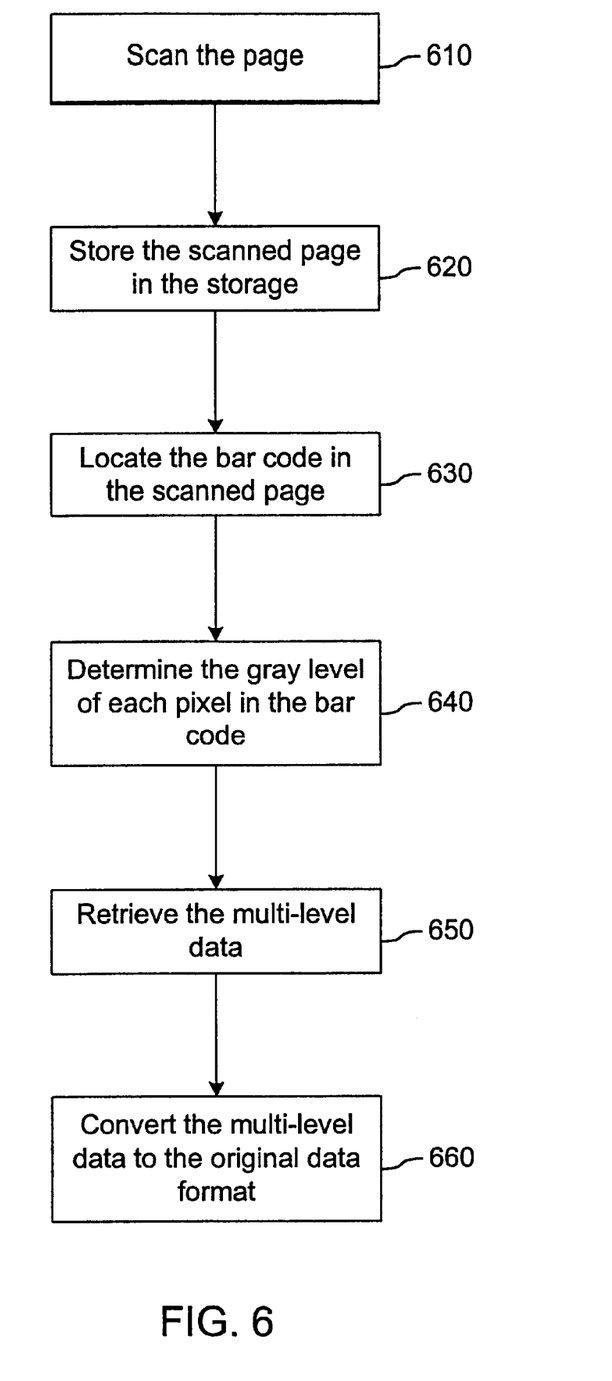
FIG. 6 is a flow diagram of a decoding process consistent with the present invention.

FIG. 6 is a flow diagram of a decoding process consistent with the present invention. The decoding process may be applied to a bar code held in the storage 110 or from a bar code scanned by the scanner 170. In FIG. 6, the decoding process covers the scanning of the bar code from the page 180. However, the process is the same after the bar code has been scanned and has been stored in the storage 110.

As shown in FIG. 6, the first step in the decoding process is to scan the page 180 (step 610). The scanning may be for one or more pages 180. Each page 180 may include images, text, and one or more bar codes. The scanned page 180 may then be placed in the storage 110 (step 620). The scanned page 180 may be stored as a single document in the storage 110 or as independent documents for each type of content in the scanned page 180. For example, each image, each piece of text, and each bar code in the scanned page 180 may be stored as an independent document, although an indication is preferably included in each document of its relation to the other documents from the scanned page 180.

To decode the bar code in the scanned page 180 stored in the storage 110, the bar code in the scanned page 180 is located (step 630). The scanner 170 may be programmed to locate the bar codes either automatically or manually. For the automatic location, the scanner 170 may look for characteristic marks on the scanned page 180 to determine the location of the bar code. For example, some fiduciary marks may be included around the edges of the bar code, such as by putting black squares of a predetermined size at each of the four corners of the bar code. For the manual location, a user operating the scanner 170 may view the scanned document and provide an indication through the input device 120 to identify the location of the bar code. The functionality for locating the bar code may be implemented as software executed by the processor 130.

Once the bar code is located, the gray level of each pixel in the bar code is determined (step 640). As discussed above, each pixel in the bar code may correspond to a single dot at the maximum resolution of the laser 160 that printed the bar code and/or the maximum resolution of the scanner 170 that scanned the page 180 on which the bar code was present. Alternatively, each pixel in the bar code may correspond to a block of dots, such as a 3×3 block of dots, to facilitate the proper decoding of the bar code, particularly if the resolution of the scanner 170 is lower than the resolution of the laser 160.

The gray level of each pixel in the bar code may be established by determining the value of the optical density of each pixel. The black pixels have the highest optical density, the white pixels have the lowest optical density, and the gray pixels have optical densities in between the optical densities of the black and white pixels. The gray level of the pixel is then determined by comparing the optical density value of the pixel with the optical density values associated with the different gray levels corresponding to black, white and gray pixels. The comparison need not be done by finding equalities between the optical density value of the pixel and the optical density values associated with the different gray levels. Rather, each of the gray levels may be associated with a range of optical densities, such that the pixel corresponds to a particular gray level if its optical density value falls within the range associated with that particular gray level.

After the gray level for each pixel of the bar code has been determined, the multi-level data can be retrieved (step 650). As discussed above in the encoding process, each component of the multi-level data corresponds to a particular gray level, such as shown in Table 1. Given the gray level of each pixel, the multi-level data corresponding to each pixel can be determined. For example, if the bar code of FIG. 3A is scanned and the gray level of each pixel is determined, the multi-level data corresponding to the pixel 302 would be 0, the multi-level data corresponding to the pixel 304 would be 1, and so on for the particular numerical base.

The multi-level data that is retrieved depends upon the number of gray levels in the bar code. For example, if a bar code is a 4-level bar code, the multi-level data may be 0, 1, 2 or 3 for a base-4 system. When retrieving the multi-level data, the number of gray levels may be determined automatically or may be input by a user.

The multi-level data may then be converted to the original data format (step 660). The original data format may be a binary format or a hexadecimal format, such as for ASCII text. The original data format may be predetermined to be binary or hexadecimal, or may be determined from the bar code itself. For example, the bar code may reserve the first four pixels of the bar code to indicate what was the original base numbering format of the encoded data.

Once the original data format is determined, the conversion from the multi-level data may be done by performing direct conversion from the base of the multi-level data, which is base four in the example of FIG. 3A and Table 1, to the base of the original data format, which is binary in the example of Table 1. The multi-level data corresponding to the bar code of FIG. 3A is 010333200 in base-4. Converting this data to binary results in 000100111111100000 as being the original data.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for developing a bar code representing the encoding of a set of data, the bar code including pixels having one black level, one white level and at least one gray level, comprising:

generating a multi-level data representation of the set of data, the number of levels corresponding to the sum of the black level, the white level and the number of gray levels;

determining a pixel color for each component of the multi-level data representation, a pixel color for at least one of the components being one of the at least one gray levels; and printing the determined pixel color for each component to form the bar code.

2. A method according to claim 1, wherein the generating of the multi-level data includes converting the set of data into a base corresponding to the numbers of levels of the multi-level data.

3. A method according to claim 1, wherein the step of printing includes modulating a laser.

4. A method according to claim 3, wherein the step of modulating the laser includes using pulse width modulation.

5. A method according to claim 3, wherein the step of modulating includes keeping the laser on for less than a full period t for each pixel having a gray level.

6. A method according to claim 5, wherein the laser is kept on for a first portion of the period t for a first pixel having a first gray level and is kept on for a second portion of the period t for a second pixel having a second gray level.

7. A method according to claim 6, wherein the first portion is longer than the second portion if the first pixel is darker than the second pixel.

8. A method for creating and printing a bar code with a laser printer having a laser, comprising:

converting a set of data into the bar code having pixels with one black level, one white level and at least one gray level; and modulating the laser of the laser printer to print a gray level pixel of the bar code.

9. A method according to claim 8, wherein the modulating includes turning the laser on and off during the period in which the gray level pixel is being printed.

10. A method according to claim 8, wherein the step of modulating includes keeping the laser on for less that a full period t when printing each gray pixel.

11. A method according to claim 10, wherein the laser is kept on for a first portion of the period t for a first pixel having a first gray level and is kept on for a second portion of the period t for a second pixel having a second gray level.

12. A method according to claim 11, wherein the first portion is longer than the second portion when the first pixel is darker than the second pixel.

13. A method according to claim 8, where the step of modulating includes using pulse width modulation.

14. A printer for printing a bar code representing the encoding of a set of data, the bar code including pixels having one black level, one white level and at least one gray level, comprising:

a controller which receives a multi-level data representation of the set of data, the number of levels corresponding to the sum of the black level, the white level and the number of gray levels, and determines a pixel color for each component of the multi-level data representation, a pixel color for at least one of the components being one of the at least one gray levels; and a laser, coupled to the controller, which prints each component to form the bar code based on the determined pixel color from the controller.

15. A printer according to claim 14, wherein the controller controls the modulation of the laser.

16. A printer according to claim 15, wherein the controller controls the modulation of the laser using pulse width modulation.

17. A printer according to claim 15, wherein the controller keeps the laser on for less that a full period t for each pixel having a gray level.

18. A printer according to claim 17, wherein the controller keeps the laser on for a first portion of the period t for a first pixel having a first gray level and keeps the laser on for a second portion of the period t for a second pixel having a second gray level.

19. A printer according to claim 18, wherein the first portion is longer than the second portion if the first pixel is darker than the second pixel.

20. A printer for creating and printing a bar code, comprising:

a controller which converts a set of data into the bar code having pixels with one black level, one white level and at least one gray level;

a laser, coupled to the controller, which is modulated by the controller to print a gray level pixel of the bar code.

21. A printer according to claim 20, wherein the controller turns the laser on and off during the period in which the gray level pixel is being printed.

22. A printer according to claim 20, wherein the controller keeps the laser on for less that a full period t when printing each gray pixel.

23. A printer according to claim 22, wherein the controller keeps the laser on for a first portion of the period t for a first pixel having a first gray level and keeps the laser on for a second portion of the period t for a second pixel having a second gray level.

24. A printer according to claim 23, wherein the first portion is longer than the second portion when the first pixel is darker than the second pixel.

25. A printer according to claim 20, where the controller controls the modulation of the laser using pulse width modulation.

26. A computer readable medium operable on a computer for developing a bar code representing the encoding of a set of data, the bar code including pixels having one black level, one white level and at least one gray level, the computer readable medium configured to:

generate a multi-level data representation of the set of data, the number of levels corresponding to the sum of the black level, the white level and the number of gray levels;

determine a pixel color for each component of the multi-level data representation, a pixel color for at least one of the components being one of the at least one gray levels; and print the determined pixel color for each component to form the bar code.

27. A computer readable medium according to claim 26, further configured to convert the set of data into a base corresponding to the numbers of levels of the multi-level data.

28. A computer readable medium according to claim 26, further configured to modulate a laser.

29. A computer readable medium according to claim 28, further configured to use pulse width modulation to modulate the laser.

30. A computer readable medium according to claim 28, further configured to keep the laser on for less that a full period t for each pixel having a gray level.

31. A computer readable medium according to claim 30, wherein further configured to keep the laser on for a first portion of the period t for a first pixel having a first gray level and to keep the laser on for a second portion of the period t for a second pixel having a second gray level.

32. A computer readable medium according to claim 31, wherein the first portion is longer than the second portion if the first pixel is darker than the second pixel.

33. A computer readable medium operable on a computer for creating and printing a bar code with a laser printer having a laser, the computer readable medium configured to:

convert a set of data into the bar code having pixels with one black level, one white level and at least one gray level; and modulate the laser of the laser printer to print a gray level pixel of the bar code.

34. A computer readable medium according to claim 33, further configured to turn the laser on and off during the period in which the gray level pixel is being printed.

35. A computer readable medium according to claim 33, further configured to keep the laser on for less that a full period t when printing each gray pixel.

36. A computer readable medium according to claim 35, further configured to keep the laser on for a first portion of the period t for a first pixel having a first gray level and to keep the laser on for a second portion of the period t for a second pixel having a second gray level.

37. A computer readable medium according to claim 36, wherein the first portion is longer than the second portion when the first pixel is darker than the second pixel.

38. A computer readable medium according to claim 33, where further configured to use pulse width modulation to modulate the laser.

* * * * *